US011491658B2

(12) United States Patent
Takaoka (10) Patent No.: US 11,491,658 B2
(45) Date of Patent: Nov. 8, 2022

(54) METHODS AND SYSTEMS FOR AUTOMATICALLY ANNOTATING ITEMS BY ROBOTS

(71) Applicant: Toyota Research Institute, Inc., Los Altos, CA (US)

(72) Inventor: Yutaka Takaoka, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 371 days.

(21) Appl. No.: 16/690,607

(22) Filed: Nov. 21, 2019

(65) Prior Publication Data

US 2021/0023716 A1 Jan. 28, 2021

Related U.S. Application Data

(60) Provisional application No. 62/877,522, filed on Jul. 23, 2019.

(51) Int. Cl.
*B25J 9/16* (2006.01)
*G06T 7/521* (2017.01)
*G06T 7/11* (2017.01)

(52) U.S. Cl.
CPC ............. *B25J 9/1697* (2013.01); *B25J 9/162* (2013.01); *G06T 7/11* (2017.01); *G06T 7/521* (2017.01)

(58) Field of Classification Search
CPC . B25J 9/1697; B25J 9/162; G06T 7/11; G06T 7/521; G06T 2207/10016;
(Continued)

(56) References Cited

U.S. PATENT DOCUMENTS 9,144,905 B1 9/2015 Sinapov et al.
9,701,015 B2 * 7/2017 Buehler ............... G06V 10/235
(Continued)

FOREIGN PATENT DOCUMENTS

CN 108942923 A 12/2018
CN 108955525 A 12/2018
WO 2018087546 A1 5/2018

OTHER PUBLICATIONS

Jun Hatori, et al., "Interactively Picking Real-World Objects With Unconstrained Spoken Language Instructions," URL: https://arxiv.org/pdf/1710.06280.pdf, Mar. 28, 2018.
(Continued)

*Primary Examiner* — Ryan Rink
(74) *Attorney, Agent, or Firm* — Dinsmore & Shohl LLP (57) ABSTRACT

A robot automatically annotates items by training a semantic segmentation module. The robot includes one or more imaging devices, and a controller comprising machine readable instructions. The machine readable instructions, when executed by one or more processors, cause the controller to capture an image with the one or more imaging devices, identify a target area in the image in response to one or more points on the image designated by a user, obtain depth information for the target area, calculate a center of an item corresponding to the target area based on the depth information, rotate the imaging device based on the center, and capture an image of the item at a different viewing angle in response to rotating the view of the imaging device.

16 Claims, 8 Drawing Sheets

(58) Field of Classification Search
CPC . G06T 2207/20101; G06T 7/194; G06T 7/73; G06T 2200/04; G06T 2207/10028; G05B 2219/40543; G05B 2219/40564
See application file for complete search history.

(56) References Cited

U.S. PATENT DOCUMENTS

| | | | |
|---|---|---|---|
| 9,836,653 B2 | 12/2017 | Schnillman | |
| 10,360,531 B1* | 7/2019 | Stallman | G06K 7/1413 |
| 2019/0026585 A1* | 1/2019 | Shen | G06K 7/1443 |
| 2019/0087976 A1* | 3/2019 | Sugahara | G06K 9/6262 |
| 2019/0091869 A1 | 3/2019 | Yamazaki et al. | |
| 2019/0130214 A1* | 5/2019 | N | G06V 20/52 |
| 2019/0172271 A1* | 6/2019 | Yasuda | G06F 3/014 |
| 2020/0132888 A1* | 4/2020 | Perreault | G02B 26/0875 |
| 2021/0394367 A1* | 12/2021 | Correll | B25J 9/106 |

OTHER PUBLICATIONS

Andy Zeng, et al., "Robotic Pick-and-Place of Novel Objects in Clutter With Multi-Affordance Grasping and CrossDomain Image Matching," URL: https://vision.princeton.edu/projects/2017/arc/paper.pdf, Oct. 5, 2017.

* cited by examiner

METHODS AND SYSTEMS FOR AUTOMATICALLY ANNOTATING ITEMS BY ROBOTS

CROSS-REFERENCE TO RELATED APPLICATIONS

This application claims the benefit of U.S. Provisional Patent Application No. 62/877,522 filed on Jul. 23, 2019, the entire contents of which are herein incorporated by reference.

TECHNICAL FIELD

The present disclosure generally relates to methods and systems for automatically annotating items by robots, and, more particularly to recognizing target areas including items, taking images including the items with different angles, and training a semantic segmentation based on the images captured with different angles.

BACKGROUND

Robots may implement tasks on behalf of users. Robots may receive instructions from users and operate according to the received instructions. For example, a robot may move to a certain location in response to receiving an instruction for moving to the location from a user. As another example, a robot may carry an item from a first location to a second location in response to receiving an instruction from a user. When a user wants to sort items and put similar items into a designated box, the user needs to instruct the robot to move each item into the designated box.

Accordingly, a need exists for a robot that identifies and annotates items without manual teaching by a user and carries the items to a designated point.

SUMMARY

In one aspect, a robot includes one or more imaging devices, and a controller comprising machine readable instructions. The machine readable instructions, when executed by one or more processors, cause the controller to capture an image with the one or more imaging devices, identify a target area in the image in response to one or more points on the image designated by a user, obtain depth information for the target area, calculate a center of the item corresponding to the target area based on the depth information, rotate the one or more imaging devices based on the center, and capture an image of the item at a different viewing angle in response to rotating the one or more imaging devices.

In another aspect, a system includes a computing device, and a robot. The robot is configured to capture an image with one or more imaging devices, identify a target area in the image in response to one or more points on the image designated by a user, obtain depth information for the target area, calculate a center of an item corresponding to the target area based on the depth information, rotate the one or more imaging devices based on the center, and capture an image of the item at a different viewing angle in response to rotating the one or more imaging devices.

In yet another aspect, a method includes capturing an image with one or more imaging devices, identifying a target area in the image in response to one or more points on the image designated by a user, obtaining depth information for the target area, calculating a center of an item corresponding to the target area based on the depth information, rotating the one or more imaging devices based on the center, and capturing an image of the item at a different viewing angle in response to rotating the one or more imaging devices.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 4A:
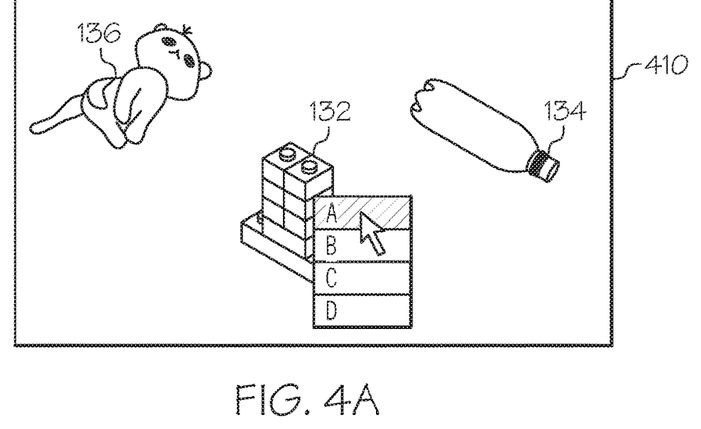
FIG. 4A depicts a user assigning an item to a designation, according to one or more embodiments described and illustrated herein.

The embodiments described herein are directed to robots that automatically annotate items without manual teaching by a user. By referring to FIGS. 1, 2, and 5, the robot 100 includes one or more imaging devices 116, and a controller 210 comprising machine readable instructions. The controller 210 captures an image (e.g., image 510 in FIG. 5) by the one or more imaging devices 116 and identifies one or more target areas 512, 514, 516 in the image 510 in response to one or more points on the image designated by a user, e.g., designations by a user shown in FIGS. 4A through 4C. The controller 210 obtains depth information for each of the target areas 512, 514, 516 and calculates a center of each of items corresponding to target areas based on the depth information. The controller 210 rotates the one or more imaging devices 116 based on the center (e.g., centers 522, 524, 526 in FIG. 6), and captures an image of each of the items at a different viewing angle in response to rotating the view of the imaging device. According to the present disclosure, the robot may identify target areas based on semantic segmentation and learn the appearance of multiple items in various different orientations by rotating imaging devices and capturing the multiple items at different angles. The robot trains the semantic segmentation module based on the images of the multiple items at different angles, which enhances the ability of identifying items and assigning the items to appropriate destinations.

Figure 1:
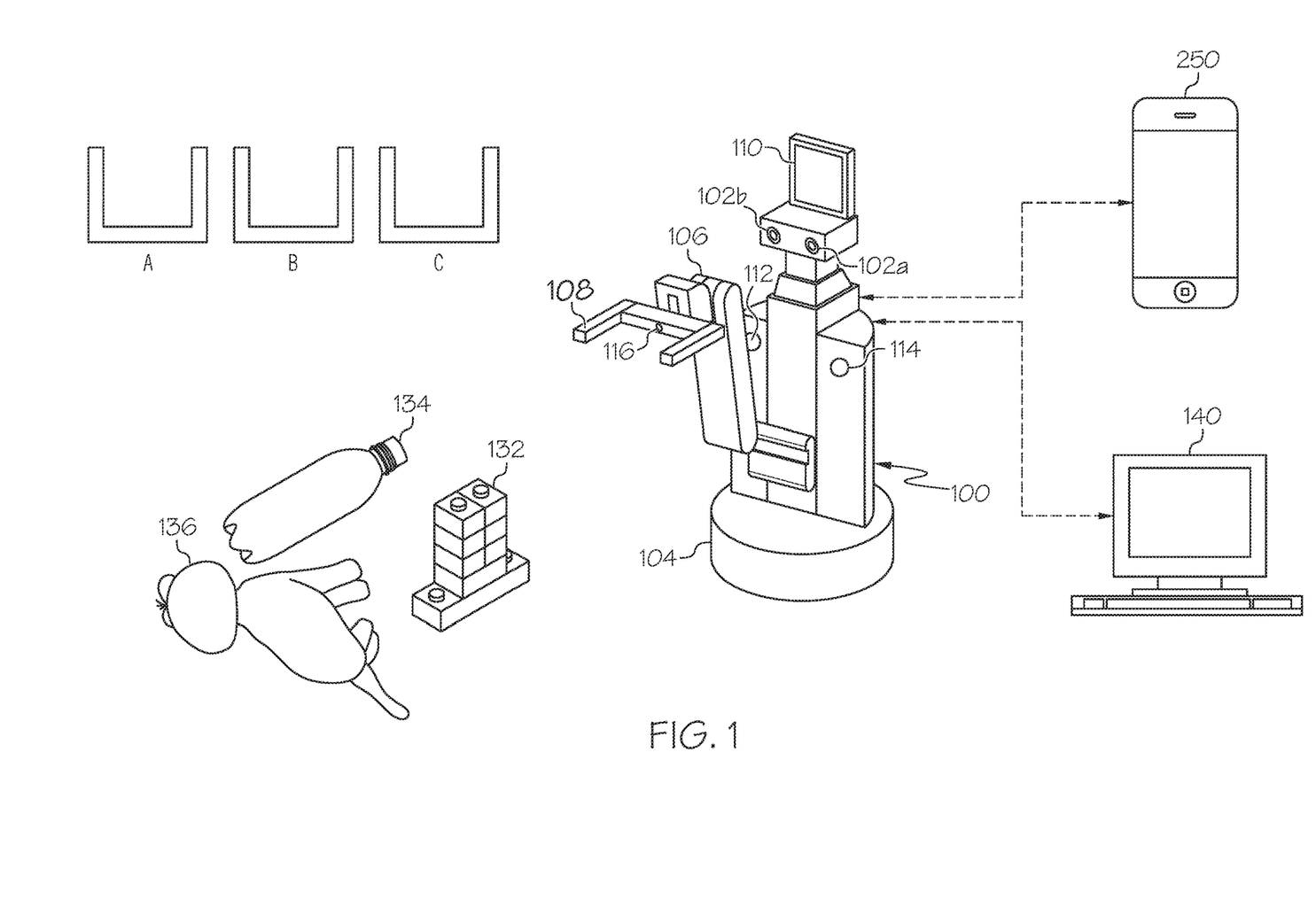
FIG. 1 schematically depicts a robot identifying and annotating items, according to one or more embodiments described and illustrated herein.

FIG. 1 depicts a robot 100 annotating multiple items, according to one or more embodiments described and shown herein. In embodiments, the robot 100 may capture an image of multiple items including a block 132, a bottle 134, and a doll 136 and annotate each of the items in the image according to a user's assignments. The user may designate blocks to box A, bottles to box B, and dolls to box C. The robot 100, which is illustrated generically in FIG. 1, may take on any size and configuration. For example, the robot 100 may be configured as a service robot to assist humans in the home, workplace, school, or healthcare facility, such as the robot 100 illustrated in FIG. 1. In another embodiment, the robot may be a production robot utilized within a manufacturing facility. It should be understood that the embodiments described herein are not limited to any specific type of robot.

The robot 100 illustrated in FIG. 1 generally comprises image capturing devices 102a, 102b, an arm 106, a gripping assembly 108, a locomotion device 104, a screen 110, a microphone 112, a speaker 114, and one or more imaging devices 116. The image capturing devices 102a, 102b and the one or more imaging devices 116 may be configured as digital cameras capable of acquiring still image and/or digital video. The image capturing devices 102a, 102b depicted in FIG. 1 may enable the robot 100 to navigate in an area and recognize items nearby. The one or more imaging devices 116 may include, but are not limited to, RGB-D sensors, or depth sensors configured to obtain depth information of a target area.

The locomotion device 104 is utilized by the robot 100 to maneuver within an operating space. In some embodiments, the locomotion device is tracked locomotion device. However, in other embodiments, the robot 100 may include one or more locomotive devices other than a tracked locomotive device. For example, the robot 100 may maneuver within the operating space using one or more wheels or legs. In some embodiments, the robot 100 may include more than two locomotive devices. In some embodiments, the robot 100 may be an unmanned aerial vehicle, or an unmanned submersible.

The arm 106 and gripping assembly 108 may be servo-actuated in one embodiment to manipulate items that the robot 100 encounters within the operating space. Other actuation mechanisms may be utilized, such as pneumatic drives, hydraulic drives, electro-active polymer motors, etc. In some embodiments, the robot 100 may include only one arm and gripping assembly or more than two arms and gripping assemblies. The gripping assembly 108 is rotatably coupled to the arm 106. The gripping assembly 108 includes the one or more imaging devices 116. The view and/or orientation of the one or more imaging devices 116 rotates as the gripping assembly 108 rotates.

The screen 110 may display images, videos, text, etc. which are visible to users proximate to the robot 100. For example, the screen 110 may display text that describes an operation that the robot 100 is currently implementing, e.g., picking up and sorting items. In some embodiments, the screen 110 may be a touch screen. The microphone 112 may record audio external to the robot 100, e.g., voice by a user.

The robot 100 may communicate with a computing device 140 through wireless communication which will be described in detail with reference to FIG. 2. The robot 100 may capture an image using one or more imaging devices 116 and transmit the captured image to the computing device 140. The computing device 140 may display the received image on its screen. The robot 100 may also communicate with a mobile device 250 (e.g., a smartphone) through wireless communication which will be described in detail with reference to FIG. 2. The robot 100 may capture an image using one or more imaging devices 116 and transmit the captured image to the mobile device 250. The mobile device 250 may display the received image on its screen.

In embodiments, the robot 100 is assigned a task to sort items into one of box A, box B, and box C. For example, a user may assign the block 132 to box A, assign the bottle 134 to box B, and assign the doll 136 to box C. Assigning process will be explained in detailed below with reference to FIGS. 4A through 4C.

Figure 2:
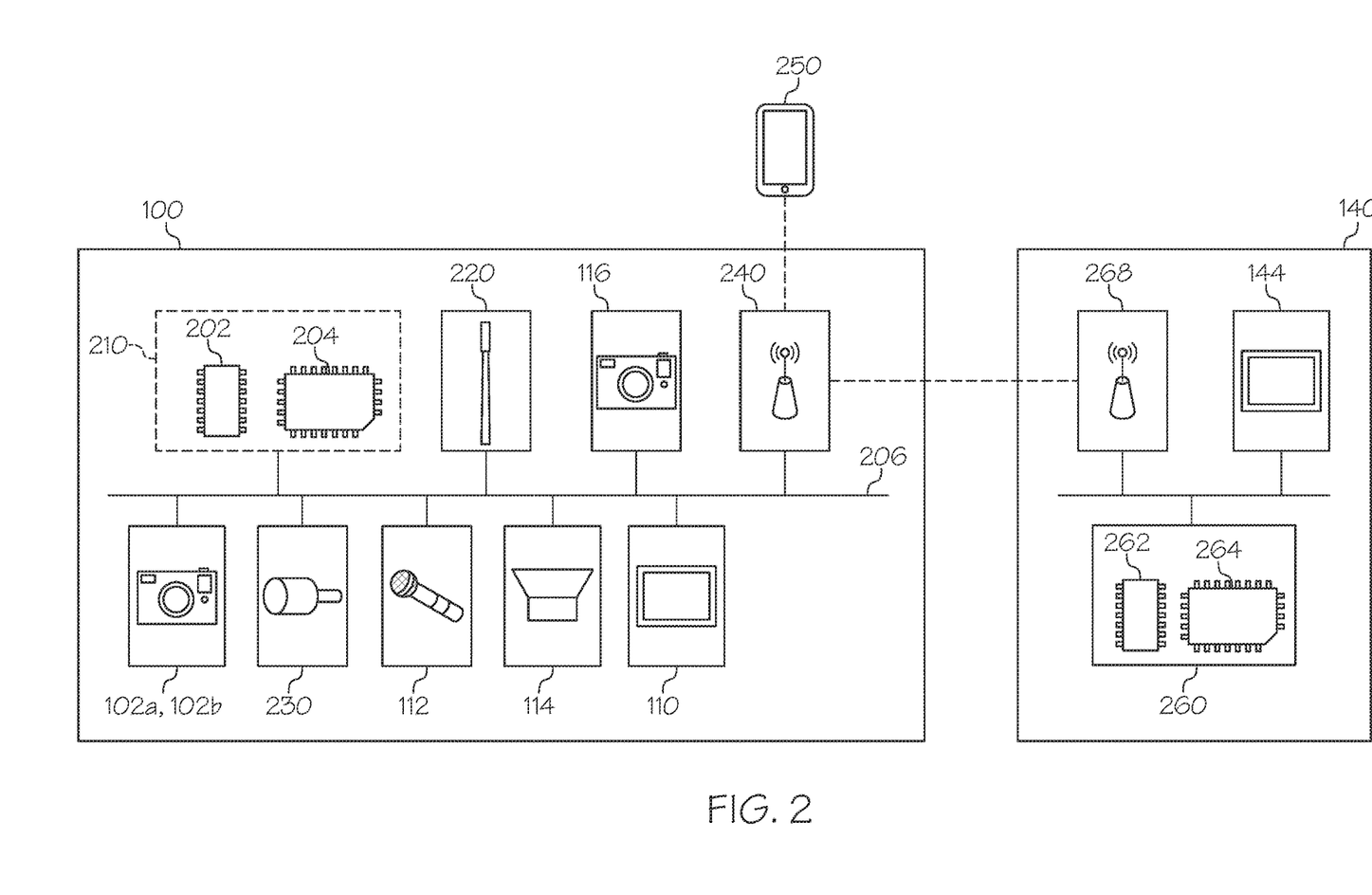
FIG. 2 depicts schematic diagrams of a robot and computing device, according to one or more embodiments described and illustrated herein.

Referring now to FIG. 2, various internal components of the robot 100 are illustrated. The robot 100 includes a controller 210 that includes one or more processors 202 and one or more memory modules 204, the image capturing devices 102a, 102b, a satellite antenna 220, actuator drive hardware 230, network interface hardware 240, the screen 110, the microphone 112, the speaker 114, and one or more imaging devices 116. In some embodiments, the one or more processors 202, and the one or more memory modules 204 may be provided in a single integrated circuit (e.g., a system on a chip). In some embodiments, the one or more processors 202, and the one or more memory modules 204 may be provided as separate integrated circuits.

Each of the one or more processors 202 is configured to communicate with electrically coupled components, and may be configured as any commercially available or customized processor suitable for the particular applications that the robot 100 is designed to operate. Each of the one or more processors 202 may be any device capable of executing machine readable instructions. Accordingly, each of the one or more processors 202 may be a controller, an integrated circuit, a microchip, a computer, or any other computing device. The one or more processors 202 are coupled to a communication path 206 that provides signal interconnectivity between various modules of the robot 100. The communication path 206 may communicatively couple any number of processors with one another, and allow the modules coupled to the communication path 206 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 206 may be formed from any medium that is capable of transmitting a signal such as, for example, conductive wires, conductive traces, optical waveguides, or the like. Moreover, the communication path 206 may be formed from a combination of mediums capable of transmitting signals. In one embodiment, the communication path 206 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 204 may be coupled to the communication path 206. The one or more memory modules 204 may include a volatile and/or nonvolatile computer-readable storage medium, such as RAM, ROM, flash memories, hard drives, or any medium capable of storing machine readable instructions such that the machine readable instructions can be accessed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, user-oriented programming (OOP), scripting languages, microcode, etc., that may be compiled or assembled into machine readable instructions and stored on the one or more memory modules 204. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 204 may be configured to store one or more modules, each of which includes the set of instructions that, when executed by the one or more processors 202, cause the robot 100 to carry out the functionality of the module described herein. For example, the one or more memory modules 204 may be configured to store a robot operating module, including, but not limited to, the set of instructions that, when executed by the one or more processors 202, cause the robot 100 to carry out general robot operations. Furthermore, the one or more memory modules 204 may store a semantic segmentation module. The semantic segmentation module is configured to recognize and understand what is in the image in pixel level. The semantic segmentation module may be a program module in the form of operating systems, application program modules, and other program modules stored in one or more memory modules. Such a program module may include, but is not limited to, routines, subroutines, programs, objects, components, data structures, and the like for performing specific tasks or executing specific data types as will be described below.

The image capturing devices 102a, 102b may be coupled to the communication path 206. The image capturing devices 102a, 102b may receive control signals from the one or more processors 202 to acquire image data of a surrounding operating space, and to send the acquired image data to the one or more processors 202 and/or the one or more memory modules 204 for processing and/or storage. The image capturing devices 102a, 102b may be directly connected to the one or more memory modules 204, or, in an alternative embodiment, include dedicated memory devices (e.g., flash memory) that are accessible to the one or more processors 202 for retrieval.

Each of the image capturing devices 102a, 102b may have any suitable resolution and may be configured to detect radiation in any desirable wavelength band, such as an ultraviolet wavelength band, a near-ultraviolet wavelength band, a visible light wavelength band, a near infrared wavelength band, or an infrared wavelength band. In some embodiments, at least one of the image capturing devices 102a, 102b may be a standard definition (e.g., 640 pixels× 480 pixels) camera. In some embodiments, at least one of the image capturing devices 102a, 102b may be a high definition camera (e.g., 1440 pixels×1024 pixels or 1280 pixels×1024 pixels). In some embodiments, at least one of the image capturing devices 102a, 102b may have a resolution other than 640 pixels×480 pixels, 1440 pixels×1024 pixels, or 1280 pixels×1024 pixels. The image capturing devices 102a, 102b may provide image data in the form of digital video and/or one or more digital photographs.

The robot 100 includes a satellite antenna 220 coupled to the communication path 206 such that the communication path 206 communicatively couples the satellite antenna 220 to other modules of the robot 100. The satellite antenna 220 is configured to receive signals from global positioning system satellites. Specifically, in one embodiment, the satellite antenna 220 includes one or more conductive elements that interact with electromagnetic signals transmitted by global positioning system satellites. The received signal is transformed into a data signal indicative of the location (e.g., latitude and longitude) of the satellite antenna 220 or a user positioned near the satellite antenna 220, by the one or more processors 202. In some embodiments, the robot 100 may not include the satellite antenna 220.

The actuator drive hardware 230 may comprise the actuators and associated drive electronics to control the locomotion device 104, the arm 106, the gripping assembly 108, and any other external components that may be present in the robot 100. The actuator drive hardware 230 may be configured to receive control signals from the one or more processors 202 and to operate the robot 100 accordingly. The operating parameters and/or gains for the actuator drive hardware 230 may be stored in the one or more memory modules 204.

The robot 100 includes the network interface hardware 240 for communicatively coupling the robot 100 with the mobile device 250, and the computing device 140. The mobile device 250 or the computing device 140 may authenticate itself before it initiates communication with the robot 100 through the network interface hardware 240. The display of the mobile device 250 or the computing device 140 may display information to the user of the mobile device 250 or the remote computing device, e.g., the view that the robot is seeing with its cameras, a map of a room or building that the robot is in, the path of the robot, or a highlight of an item to be grasped. The network interface hardware 240 may be coupled to the communication path 206 and may be configured as a wireless communications circuit such that the robot 100 may communicate with external systems and devices. The network interface hardware 240 may include a communication transceiver for sending and/or receiving data according to any wireless communication standard. For example, the network interface hardware 240 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 240 includes a Bluetooth transceiver that enables the robot 100 to exchange information with the computing device 140 or the mobile device 250 (e.g., a smartphone) via Bluetooth communication. In some embodiments, the robot 100 may not include the network interface hardware 240.

The robot 100 includes the screen 110 coupled to the communication path 206 such that the communication path 206 communicatively couples the screen 110 to other modules of the robot 100. The screen 110 may display information about a task currently implemented by the robot 100, for example, picking up items, putting times in boxes, and the like.

The robot 100 includes the microphone 112 coupled to the communication path 206 such that the communication path 206 communicatively couples the microphone 112 to other modules of the robot 100. The microphone 112 may be configured for receiving user voice commands and/or other inputs to the robot 100. The microphone 112 transforms acoustic vibrations received by the microphone 112 into a speech input signal.

The robot 100 includes the speaker 114 coupled to the communication path 206 such that the communication path 206 communicatively couples the speaker 114 to other modules of the robot 100. The speaker 114 transforms data signals into audible mechanical vibrations. The speaker 114 outputs audible sound such that a user proximate to the robot 100 may interact with the robot 100.

The robot 100 includes one or more imaging devices 116. The one or more imaging devices 116 may include, but not limited to, RGB-D sensor, or depth sensors configured to obtain depth information of a target area. The one or more imaging devices 116 may have any suitable resolution and may be configured to detect radiation in any desirable wavelength band, such as an ultraviolet wavelength band, a near-ultraviolet wavelength band, a visible light wavelength band, a near infrared wavelength band, or an infrared wavelength band.

The computing device 140 includes a controller 260 that includes one or more processors 262 and one or more memory modules 264, network interface hardware 268, and the screen 144. The one or more processors 262, one or more memory modules 264, the network interface hardware 268, and the screen 144 may be components similar to the one or more processors 202, one or more memory modules 204, the network interface hardware 240, and the screen 110 as described above.

Figure 3:
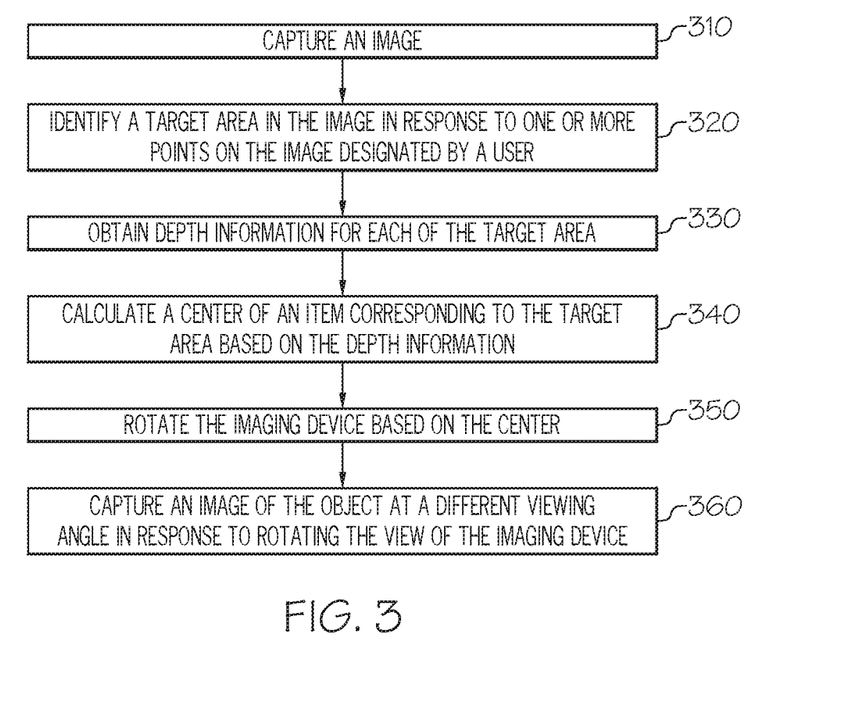
FIG. 3 schematically depicts a flowchart of a method of identifying target areas and capturing images of items in the target areas at different angles, according to one or more embodiments described and illustrated herein.

FIG. 3 depicts a flowchart of a method 300 of automatically annotating items included in images, according to one or more embodiments shown and described herein. In some embodiments, the method 300 may be implemented as logic within the machine readable instructions that, when executed by the one or more processors 202, capture an image, identify one or more target areas in the image in response to one or more points on the image designated by a user, obtain depth information for each of the target areas, calculate a center of each of items corresponding to target areas based on the depth information, rotate the imaging device based on the center, and capture an image of each of the items at a different viewing angle in response to rotating the view of the imaging device. It is noted that, while the method 300 depicts a specific sequence, additional embodiments of the present disclosure are not limited to any particular sequence.

At step 310, the robot 100 obtains image data using one or more imaging devices 116. In embodiments, the image data may be data of a variety of forms, such as, but not limited to red-green-blue ("RGB") data, depth image data, three dimensional ("3D") point data, and the like. In some embodiments, the robot 100 may receive depth image data from an infrared sensor or other depth sensor, such as an infrared sensor or depth sensor integrated with the imaging devices 116.

At step 320, the robot 100 identifies one or more target areas in the image in response to one or more points on the image designated by a user. By referring to FIG. 4A, the robot 100 may capture the image 410 and transmit the image 410 to the computing device 140. The computing device 140 may display the image 410 on the screen 144. A user may select the block 132 in the image 410 and assign the block 132 to box A. For example, the user may move a mouse cursor to a point within the block 132 in the image 410 displayed on the screen 144 and click the block 132. In response to the click, the screen 144 may display a window for selecting options A through D. The user may select option A to designate the block 132 to box A. In some embodiments, a user may touch a point within the block 132 on the screen 144. In response to the touch, the screen 144 may display a window for selecting options A through D. The user may select option A to designate the block 132 to box A.

Figure 4B:
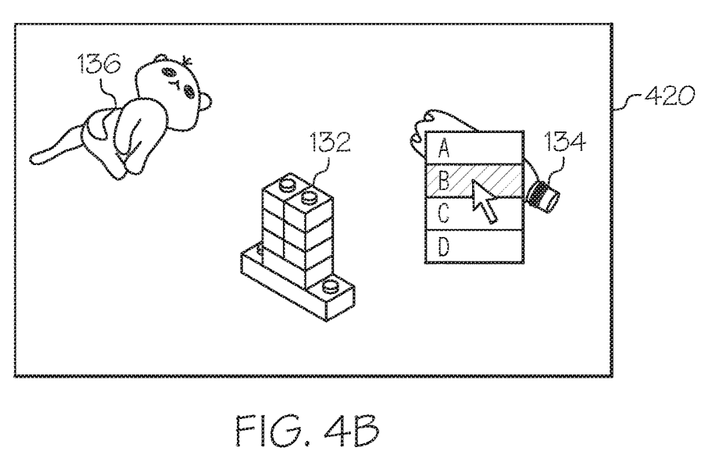
FIG. 4B depicts a user assigning an item to a designation, according to one or more embodiments described and illustrated herein.
Figure 4C:
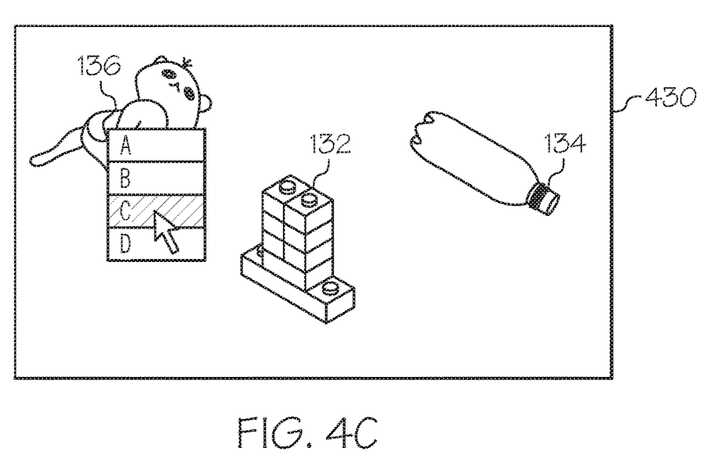
FIG. 4C depicts a user assigning an item to a designation, according to one or more embodiments described and illustrated herein.

Similarly, the user may select the bottle 134 in the image 410 and assign the bottle 134 to box B. For example, as shown in FIG. 4B, the user may move a mouse cursor to a point within the bottle 134 in the image 410 and click the bottle 134. In response to the click, the screen 144 may display a window for selecting options A through D. The user may select option B to designate the bottle 134 to box B. Similarly, as shown in FIG. 4C, the user may select the doll 136 in the image 410 and assign the doll 136 to box C. For example, the user may move a mouse cursor to a point within the doll 136 in the image 410 and click the doll 136. In response to the click, the screen 144 may display a window for selecting options A through D. The user may select option C to designate the doll 136 to box C.

Figure 5:
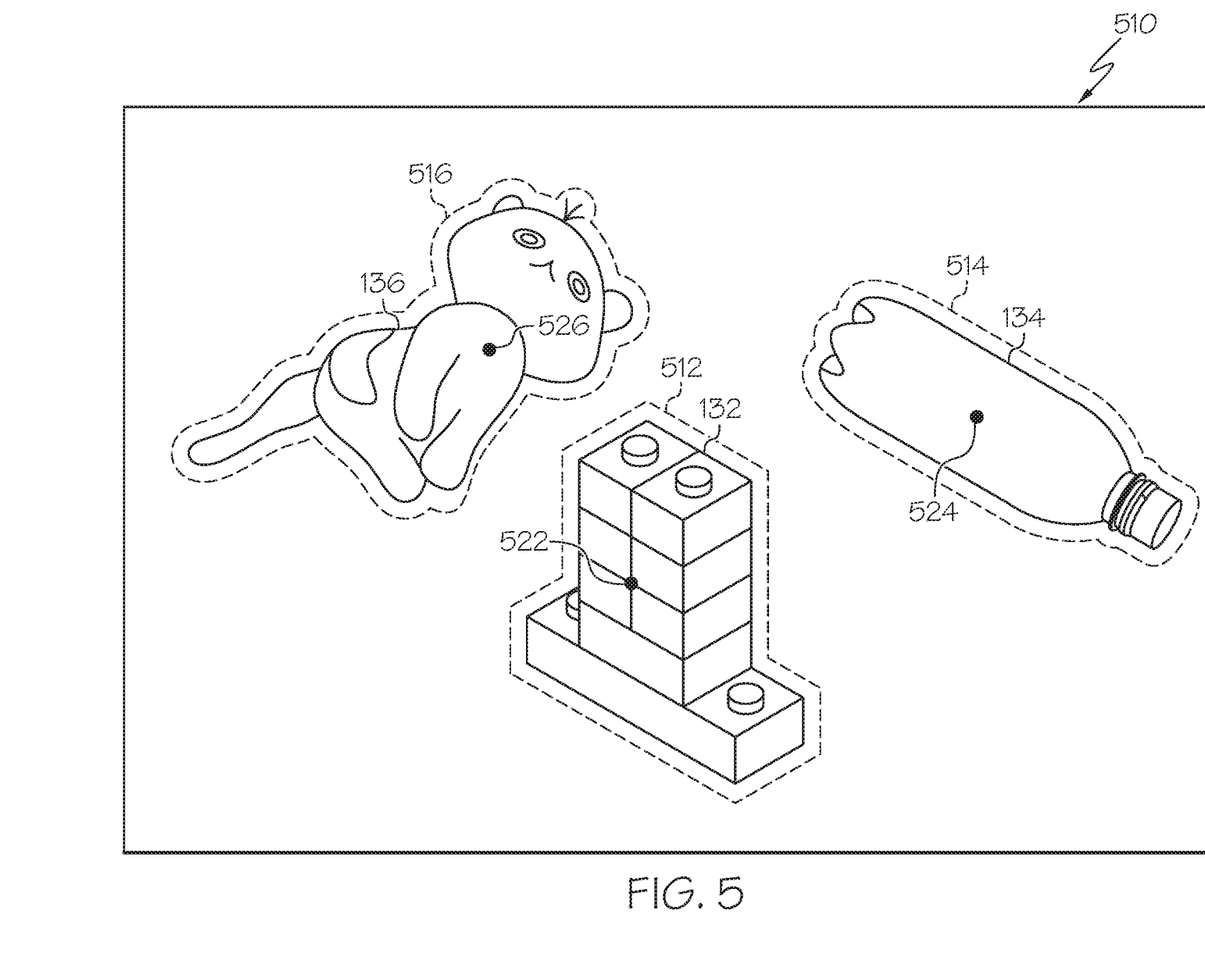
FIG. 5 depicts an image with target areas based on semantic segmentation, according to one or more embodiments described and illustrated herein.

In response to the designation by the user, the robot 100 may identify one or more target areas in the image 410. In embodiments, the robot 100 may identify target areas by implement semantic segmentation on the image 410. For example, as shown in FIG. 5, the robot 100 may segment the image 510 to obtain three target areas 512, 514, 516. The target area 512 includes the block 312, the target area 514 includes the bottle 134, and the target area 516 includes the doll 136. Each of the target areas 512, 514, 516 corresponds to the three points designated by the user, respectively. Each of the target areas 512, 514, 516 includes a plurality pixels.

Referring back to the flowchart of FIG. 3, at step 330, the robot 100 obtains depth information for each of the target areas. For example, by referring to FIG. 5, the robot 100 obtains depth information for target areas 512, 514, 516 using one or more imaging devices 116 such as RGB-D sensors, or depth sensors.

At step 340, the robot 100 calculates a center of each of the items corresponding to target areas based on the depth information obtained in step 330. For example, the robot 100 may calculate the center 522 of mass of the block 132 by averaging the depth information for the target area 512 in FIG. 5. The center 522 may be a 3D position of the block 132. Similarly, the robot 100 may calculate the center 524 of mass of the bottle 134 by averaging the depth information for the target area 514. The robot 100 may calculate the center 526 of mass of the doll 136 by averaging the depth information for the target area 516.

Figure 6A:
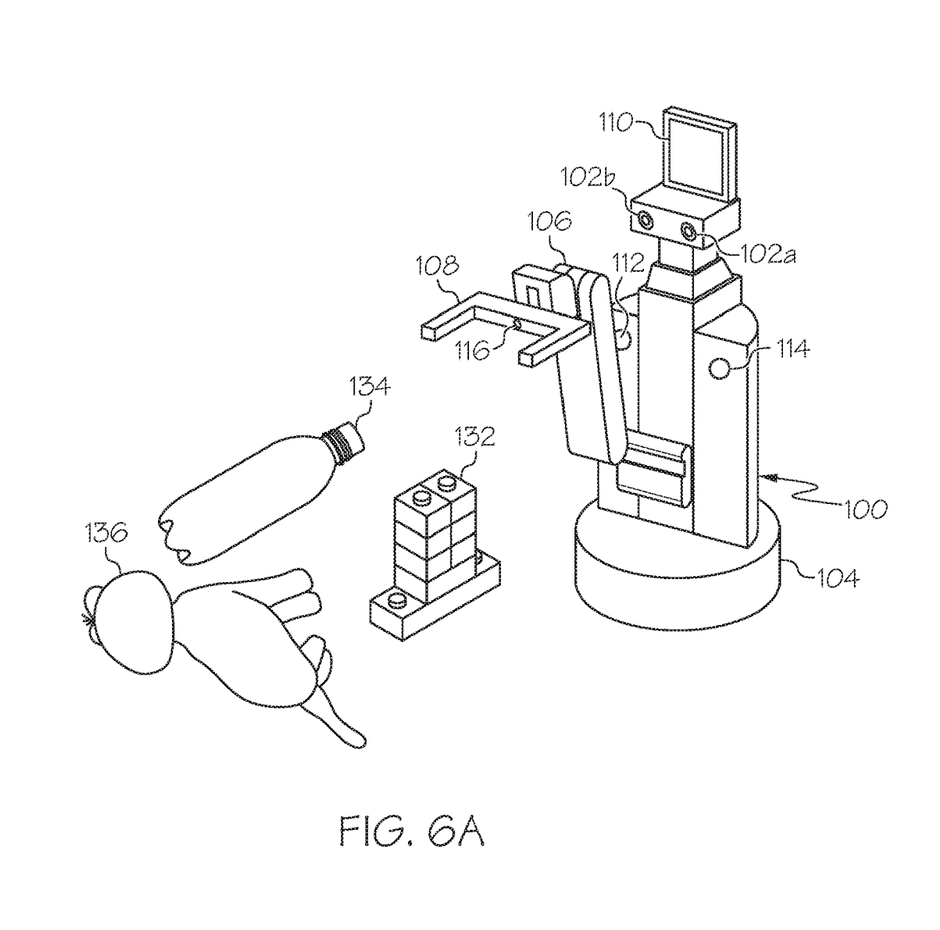
FIG. 6A depicts a robot capturing an image of items, according to one or more embodiments described and illustrated herein.
Figure 6B:
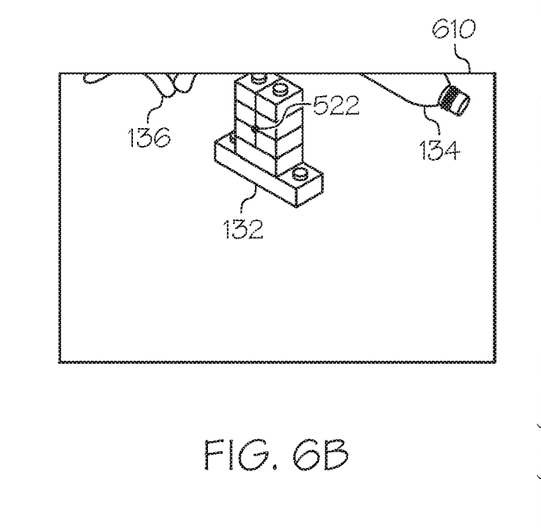
FIG. 6B depicts an image captured by the robot, according to one or more embodiments described and illustrated herein.

At step 350, the robot 100 rotates one or more imaging devices 116 based on the center calculated in step 340. By referring to FIGS. 6A and 6B, the robot 100 may actuate the arm 106 or the locomotion device 104 to move the robot 100 such that one or more imaging devices 116 focus on the center 522 of the block 132 and capture an image including the block 132. FIG. 6B depicts an image 610 captured by the robot 100 after focusing on the center 522 of the block 132. The center 522 of the block 132 is calculated by averaging the depth information for the target area 512 in FIG. 5.

Figure 7A:
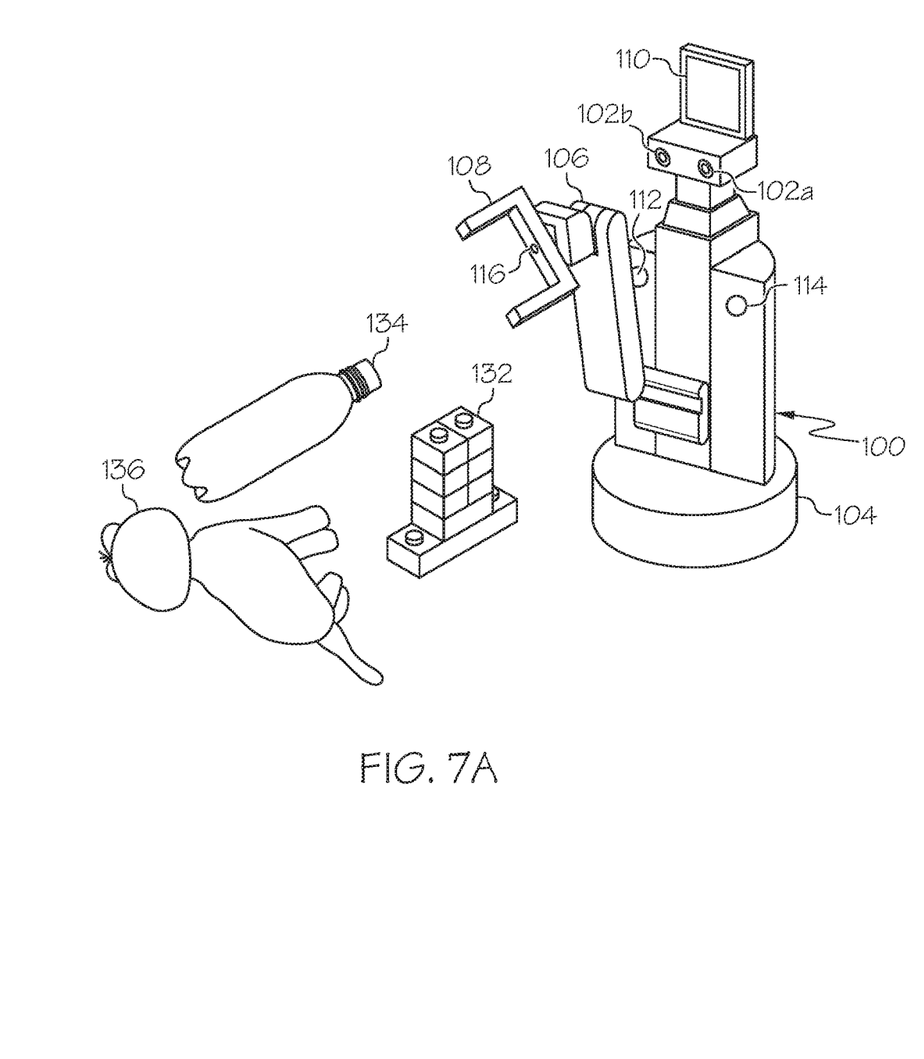
FIG. 7A depicts a robot capturing an image of items after rotating imaging devices, according to one or more embodiments described and illustrated herein.

Then, by referring to FIG. 7A, the robot 100 may rotate one or more imaging devices 116 by rotating the gripping assembly 108. The view of the one or more imaging devices 116 is rotated around the center 522 of the block 132.

Figure 7B:
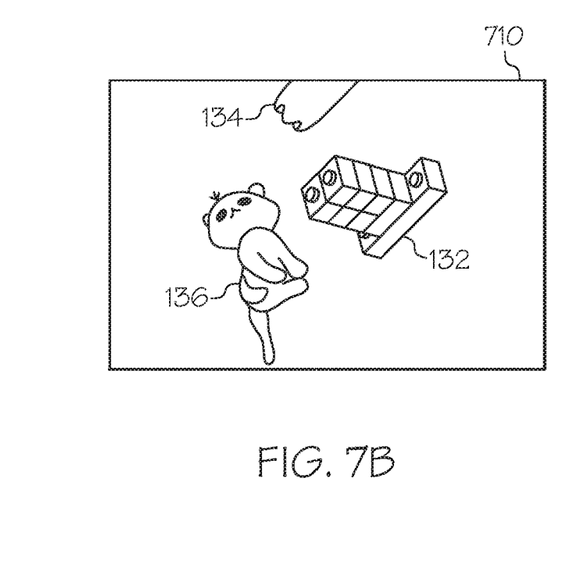
FIG. 7B depicts an image captured by the robot after rotating imaging devices, according to one or more embodiments described and illustrated herein.
Figure 8A:
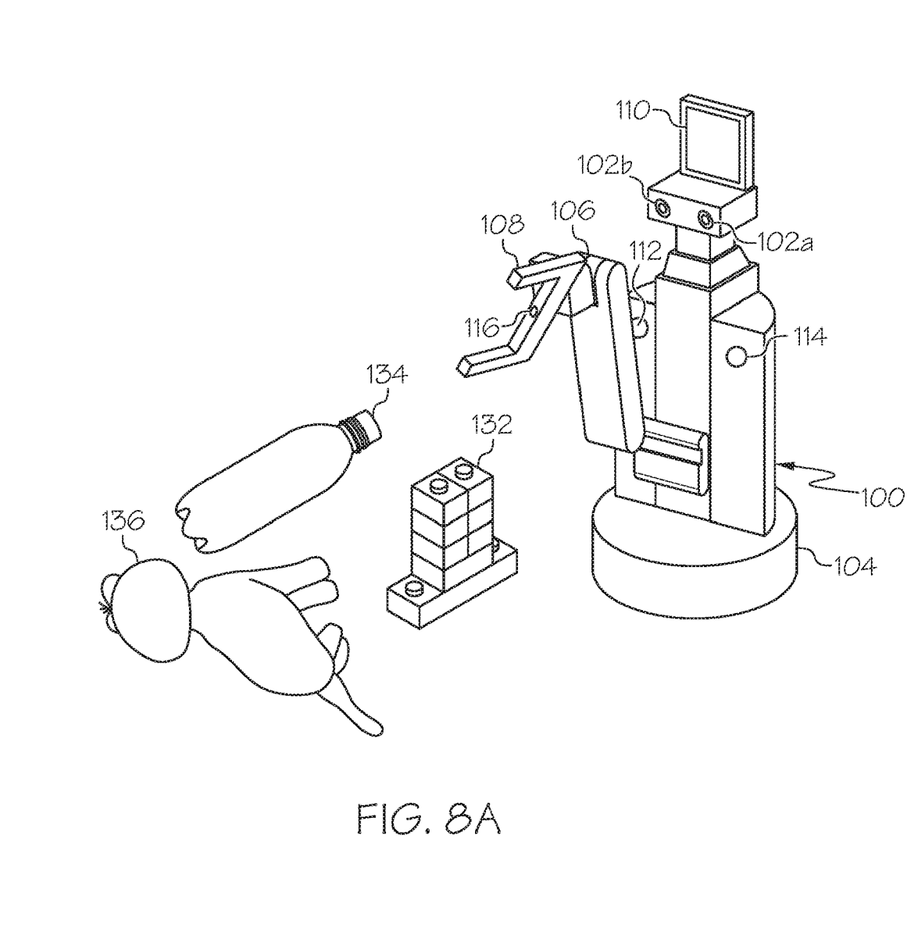
FIG. 8A depicts a robot capturing an image of items after rotating imaging devices, according to one or more embodiments described and illustrated herein.
Figure 8B:
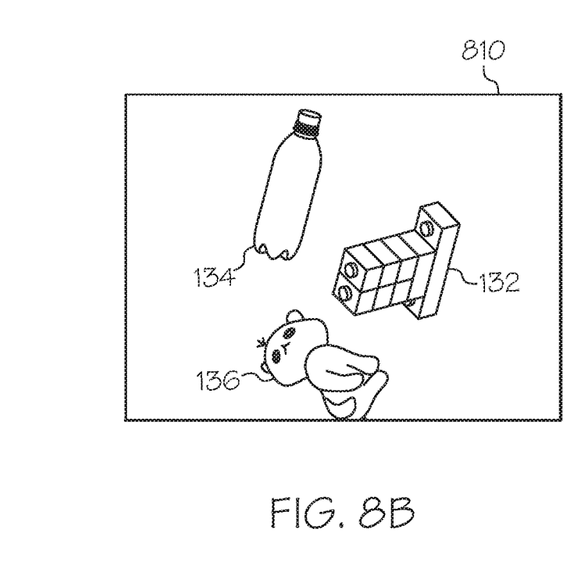
FIG. 8B depicts an image captured by the robot after rotating imaging devices, according to one or more embodiments described and illustrated herein.

At step 360, the robot 100 captures an image of each of the items at a different viewing angle in response to rotating the view of the one or more imaging devices 116. FIG. 7B depicts an image 710 captured by the robot 100 after rotating the view of one or more imaging devices 116 around the center 522 of the block 132. Thus, the robot 100 may capture an image of the block 132 at a different angle. The robot 100 may further rotate the one or more imaging devices 116 by further rotating the gripping assembly 108 as shown in FIG. 8A. The view of the one or more imaging devices 116 is rotated around the center 522 of the block 132. FIG. 8B depicts an image 810 captured by the robot 100 after further rotating the view of one or more imaging devices 116 around the center 522 of the block 132.

The captured images 610, 710, and 810 at different angles may be used to train the semantic segmentation module of the robot. For example, depth information for the block 132 in the image 610, depth information for the block 132 in the image 710, and the depth information for the block 132 in the image 810 may be used to train the semantic segmentation module as to a model to be assigned to box A. The robot 100 may use the trained semantic segmentation module to identify an item to be assigned to box A. For example, if the robot 100 captures an image including a new item, the robot 100 may determine whether depth information for the new item corresponds to depth information for a model assigned to box A of the trained semantic segmentation module. If the depth information for the item corresponds to the depth information for the model assigned to box A of the trained semantic segmentation module, the robot 100 may pick up the item by operating the arm 106 and the gripping assembly 108, navigate to box A, and put the item in box A.

The robot 100 may implement the same process with respect to the bottle 134 and the doll 136. For example, the robot 100 may actuate the arm 106 or the locomotion device 104 to move the robot 100 such that one or more imaging devices 116 focus on the center 524 of the bottle 134 and capture an image including the bottle 134. Then, the robot 100 may rotate one or more imaging devices 116 by rotating the gripping assembly 108 around the center 524, and capture an image including the bottle 134. Next, the robot 100 may actuate the arm 106 or the locomotion device 104 to move the robot 100 such that one or more imaging devices 116 focus on the center 526 of the doll 136 and capture an image including the doll 136. Then, the robot 100 may rotate one or more imaging devices 116 by rotating the gripping assembly 108 around the center 526, and capture an image including the doll 136.

The captured images of the bottle 134 at different angles may be used to train the semantic segmentation module of the robot. For example, depth information for the bottle 134 in images at different angles may be used to train the semantic segmentation module as to a model to be assigned to box B. The robot 100 may use the trained semantic segmentation module to identify a new item to be assigned to box B. For example, if the robot 100 captures an image including a new item, the robot 100 may determine whether depth information for the item corresponds to depth information for a model assigned to box B of the trained semantic segmentation module. If the depth information for the new item corresponds to the depth information for the model assigned to box B of the trained semantic segmentation module, the robot 100 may pick up the item by operating the arm 106 and the gripping assembly 108, navigate to box B, and put the item in box B. A similar process may be implemented for training a model to be assigned to box C.

Once annotation and training is completed, the robot may automatically annotate unknown items using the same manner as the user initially annotated the item. For example, the robot may obtain depth information of an unknown item, and annotate the unknown item as being assigned to box A if the depth information of the unknown item is comparable to depth information about the item previously assigned to box A.

It should now be understood that a robot automatically annotates items by training a semantic segmentation module. The robot includes one or more imaging devices, and a controller comprising machine readable instructions. The machine readable instructions, when executed by one or more processors, cause the controller to capture an image by the one or more imaging devices; identify one or more target areas in the image in response to one or more points on the image designated by a user; obtain depth information for each of the target areas; calculate a center of each of items corresponding to target areas based on the depth information; rotate the imaging device based on the center; and capture an image of each of the items at a different viewing angle in response to rotating the view of the imaging device. According to the present disclosure, the robot may identify target areas based on semantic segmentation and learn the appearance of multiple items in various different orientations by rotating imaging devices and capturing the multiple items at different angles. The robot trains the semantic segmentation module based on the images of the multiple items at different angles, which enhances the ability of identifying items and assigning the items to right destinations.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robot comprising:
   an arm;
   an imaging device coupled to a gripping assembly rotatably coupled to the arm; and
   a controller programmed to:
   capture a first image of an item at a first viewing angle with the imaging device;
   receive a target area in the image from a computing device;
   obtain depth information for the target area in the image;

calculate a center of the item corresponding to the target area based on the depth information;
move the arm such that a focus of the imaging device matches with the center of the item;
rotate the imaging device about the center by rotating the gripping assembly;
capture a second image of the item at a second viewing angle after rotating the imaging device; and
train a semantic segmentation module for the item at least based on the first image and the second image.

2. The robot of claim 1, further comprising:
a locomotion device configured to move the robot,
wherein the controller is programmed to actuate the locomotion device to move the robot proximate to the item.

3. The robot of claim 1, wherein the controller is programmed to identify the target area by implementing semantic segmentation on the captured image.

4. The robot of claim 1,
wherein the controller is programmed to calculate the center of the item corresponding to the target area by averaging depth information about target areas.

5. The robot of claim 1, wherein the imaging device includes at least one of Red-Green-Blue-Distance sensors and depth sensors.

6. The robot of claim 1,
wherein the controller is programmed to:
receive a destination for the item from the computing device;
capture another image with the imaging device;
identify another item in the another image;
determine whether the depth information for the another item corresponds to the depth information for the item based on the semantic segmentation module; and
assign the another item to the destination in response to the determination that the depth information for the another item corresponds to the depth information for the item based on the semantic segmentation module.

7. A system comprising:
a computing device comprising an input device configured to receive inputs from a user; and
a robot communicatively coupled to the computing device and comprising:
an arm
an imaging device coupled to a gripping assembly rotatably coupled to the arm; and
a controller programmed to:
capture a first image of an item at a first viewing angle with the imaging device;
receive a target area in the image from the input device;
obtain depth information for a target area in the image;
calculate a center of the item corresponding to the target area based on the depth information;
move the arm such that a focus of the imaging device matches with the center of the item;
rotate the imaging device about center by rotating the gripping assembly;
capture a second image of the item at a second viewing angle after rotating the imaging device; and
train a semantic segmentation module for the item at least based on the first image and the second image.

8. The system of claim 7, wherein the robot is configured to transmit the captured image to the computing device, and the computing device comprises a display device configured to display the captured image.

9. The system of claim 7, wherein the controller is programmed to identify the target area by implementing semantic segmentation on the captured image.

10. The system of claim 7, wherein the controller is programmed to calculate the center of the item corresponding to the target area by averaging depth information about target areas.

11. The system of claim 7, wherein the imaging device includes at least one of Red-Green-Blue-Distance sensors and depth sensors.

12. The system of claim 7,
wherein the controller is programmed to:
receive a destination for the item from the computing device;
capture another image with the imaging device;
identify another item in the another image;
determine whether the depth information for the another item corresponds to the depth information for the item based on the semantic segmentation module; and
assign the another item to the destination in response to the determination that the depth information for the another item corresponds to the depth information for the item based on the semantic segmentation module.

13. A method comprising:
capturing, by a controller, a first image of an item at a first viewing angle with an imaging device of a robot, the imaging device being coupled to a gripping assembly rotatably coupled to an arm of the robot;
receiving, by the controller, a target area in the image from a computing device;
obtaining, by the controller, depth information for a target area in the image;
calculating, by the controller, a center of an item corresponding to the target area based on the depth information;
moving, by the controller, the arm such that a focus of the imaging device matches with the center of the item;
rotating, by the controller, the imaging device about the center;
capturing, by the controller, a second image of the item at a second viewing angle after rotating the imaging device; and
training, by the controller, a semantic segmentation module for the item at least based on the first image and the second image.

14. The method of claim 13, wherein the robot comprises:
an arm; and
a gripping assembly rotatably coupled to the arm and comprising the one or more imaging device, and
wherein the one or more imaging device is rotated by rotating the gripping assembly.

15. The method of claim 13, further comprising:
training a semantic segmentation module based on images of the item at different viewing angles.

16. The method of claim 15, further comprising:
receiving a destination for the item from the computing device;
capturing another image with the imaging device;
identifying another item in the another image;
determining whether the depth information for the another item corresponds to the depth information for the item based on the semantic segmentation module; and
assigning the another item to the destination in response to the determination that the depth information for the another item corresponds to the depth information for the item based on the semantic segmentation module.

* * * * *

UNITED STATES PATENT AND TRADEMARK OFFICE
CERTIFICATE OF CORRECTION

| | |
|---|---|
| PATENT NO. | : 11,491,658 B2 |
| APPLICATION NO. | : 16/690607 |
| DATED | : November 8, 2022 |
| INVENTOR(S) | : Yutaka Takaoka |

It is certified that error appears in the above-identified patent and that said Letters Patent is hereby corrected as shown below:

On the Title Page

In page 2, Column 1, item (56), U.S. patent documents, cite no. 1, delete "Schnillman", and insert --Mark S. Schnittman--, therefor.

In the Claims

In Column 12, Line(s) 51, Claim 14, before "imaging device", delete "one or more".

Signed and Sealed this
Twenty-eighth Day of February, 2023

*Katherine Kelly Vidal*

Katherine Kelly Vidal
*Director of the United States Patent and Trademark Office*